United States Patent
Chang et al.

(10) Patent No.: US 11,544,512 B2
(45) Date of Patent: Jan. 3, 2023

(54) METHODS AND SYSTEM FOR APPLYING HYBRID INK LIMITS IN ICC PROFILE CREATION

(71) Applicant: Kyocera Document Solutions Inc., Osaka (JP)

(72) Inventors: Michael Chang, Redondo Beach, CA (US); Javier A. Morales, Rochester, NY (US)

(73) Assignee: Kyocera Document Solutions Inc., Osaka (JP)

( * ) Notice: Subject to any disclaimer, the term of this patent is extended or adjusted under 35 U.S.C. 154(b) by 105 days.

(21) Appl. No.: 17/230,134

(22) Filed: Apr. 14, 2021

(65) Prior Publication Data

US 2022/0335262 A1 Oct. 20, 2022

(51) Int. Cl.
*G06K 15/00* (2006.01)
*G06K 15/02* (2006.01)

(52) U.S. Cl.
CPC ......... *G06K 15/407* (2013.01); *G06K 15/027* (2013.01); *G06K 15/1822* (2013.01)

(58) Field of Classification Search
CPC ............... G06K 15/407; G06K 15/027; G06K 15/1822; G06F 3/1208; G06F 3/1219

USPC .......................................................... 358/1.9
See application file for complete search history.

(56) References Cited

U.S. PATENT DOCUMENTS

| | | | |
|---|---|---|---|
| 11,182,112 B1* | 11/2021 | Chang | H04N 1/6033 |
| 2017/0239957 A1* | 8/2017 | Ochs | B41J 29/393 |
| 2018/0041663 A1* | 2/2018 | Yamamoto | H04N 1/605 |

* cited by examiner

*Primary Examiner* — Kent Yip
(74) *Attorney, Agent, or Firm* — Millen, White, Zelano & Branigan, P.C.; William Nixon

(57) ABSTRACT

A hybrid ink limit is applied during the creation of an ICC profile. The hybrid ink limit takes into account a percentage total area coverage (TAC) ink limit and a volume-based ink limit. The percentage TAC ink limit is specified using an input from an operator. The volume-based ink limit is retrieved based upon the media for the ICC profile. Both ink limits are applied to primary color combinations for color patches to be printed in a test chart used to capture measurement data to create the ICC profile. A combination of primary colors at exceeds either ink limit is adjusted to meet the ink limit. The adjusted combination is used in the test chart to generate the measurement data for the ICC profile. After creation of the ICC profile, the volume-based ink limit is applied to the ICC profile color combinations to identify those combinations still over the ink limit.

20 Claims, 7 Drawing Sheets

METHODS AND SYSTEM FOR APPLYING HYBRID INK LIMITS IN ICC PROFILE CREATION

FIELD OF THE INVENTION

The present invention relates to creating ICC profiles using hybrid ink limits based on a percentage total area coverage ink limit and a total ink volume.

DESCRIPTION OF THE RELATED ART

Color management is one of the more complex aspects of color printing. Two operations may be performed for production print color management, calibration and ICC profile creation. In color management, an ICC profile is a set of data that characterizes a color input or output device, or a color space, according to standards promulgated by the International Color Consortium (ICC). Calibration provides a stable foundation on which ICC profiling can be implemented. Calibration may be relatively straight-forward as opposed to ICC profile creation. Calibration linearizes color printing device response so that individual color ramps, or colors in 10% increments (from 10%-100%) are evident.

One standard practice in ICC profile creation for a printing device is the specification of an ink limit in terms of the total area coverage (TAC). For color printing devices, the contribution of ink for each colorant ranges from 0% to 100%. Contribution of each ink limit is compiled as the TAC. Instead of the possible numerical maximum of 400%, typical ink limits range for a TAC from 250% to just over 300%.

SUMMARY OF THE INVENTION

A method for applying hybrid ink limits for color printing is disclosed. The method includes generating a plurality of color patches for a test chart. Each of the plurality of color patches is a combination of primary colors. The method also includes applying a percentage total area coverage (TAC) ink limit to the plurality of color patches. The method also includes determining if a color patch includes a combination of primary colors that exceeds the percentage TAC ink limit. The method also includes scaling back the combination of primary colors to meet the percentage TAC ink limit. The method also includes determining a total ink volume for the combination of primary colors for the color patch. The method also includes adjusting the combination of primary colors if the total ink volume exceeds a volume-based ink limit for a media supported by a printing device. The method also includes printing the adjusted color patch with the test chart at the printing device.

A method of creating an ICC profile having a hybrid ink limit is disclosed. The method includes generating a plurality of color patches for a media. Each color patch is a combination of primary colors. The method also includes specifying a percentage total area coverage (TAC) ink limit. The method also includes applying the percentage TAC ink limit to the plurality of color patches. The method also includes adjusting a first set of color patches having a combination of primary colors that exceeds the percentage TAC ink limit. The method also includes applying a volume-based ink limit corresponding to the media to the plurality of color patches. The method also includes adjusting a second set of color patches having a combination of primary colors that exceeds the volume-based ink limit. The method also includes printing a test chart having the plurality of color patches. The method also includes measuring the plurality of color patches to capture measurement data. The method also includes creating the ICC profile based on the captured measurement data and the specified percentage TAC ink limit. The method also includes applying the volume-based ink limit to ICC profile color combinations within the ICC profile. The method also includes adjusting an ICC profile combination that exceeds the volume-based ink limit.

A color printing system is disclosed. The color printing system is configured to generate a plurality of color patches for a media. Each color patch is a combination of primary colors. The color printing system also is configured to specify a percentage total area coverage (TAC) ink limit. The color printing system also is configured to apply the percentage TAC ink limit to the plurality of color patches. The color printing system also is configured to adjust a first set of color patches having a combination of primary colors that exceeds the percentage TAC ink limit. The color printing system also is configured to apply a volume-based ink limit corresponding to the media to the plurality of color patches. The color printing system also is configured to adjust a second set of color patches having a combination of primary colors that exceeds the volume-based ink limit. The color printing system also is configured to print a test chart having the plurality of color patches at a printing device. The color printing system also is configured to measure the plurality of color patches to capture measurement data with a color measurement tool. The color printing system also is configured to create the ICC profile based on the captured measurement data. The color printing system also is configured to apply the volume-based ink limit on ICC profile color combinations within the ICC profile. The color printing system also is configured to adjust an ICC profile color combination within the ICC profile that exceeds the volume-based ink limit.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments may utilize the following definitions:

Printer calibration—a process for ensuring consistent color quality generated by printing devices.

Test color patch—an area, which may be rectangular, containing a single color on a test color sheet.

Test color strip—a series or row of test color patches on a printed test color sheet.

Control strip—a test color strip that also contains encoded information.

Target print job—a printed page, containing rows of test color strips, used for printing device calibration.

Color measurement tool—a tool, such as a spectrophotometer, for measuring color patches on a test color sheet. The measurement data may consist of International Commission on Illumination (CIE) XYZ or CIELAB values. CIELAB may refer to a color space specified by the CIE to describe all the colors visible to the human eye that is used as a device-independent reference.

The disclosed embodiments allow more intelligent management of color resources within a printing system. The disclosed embodiments retain metadata about color management resources that may be used to provide more intelligent interactions between color management resources. These features would be enabled for both calibration TRCs and ICC profiles. When calibrating a printing device, the system prints a test chart with colorant ramps. The colorant ramps are used to define the TRC for each colorant as part of known printing device calibration.

Figure 1:
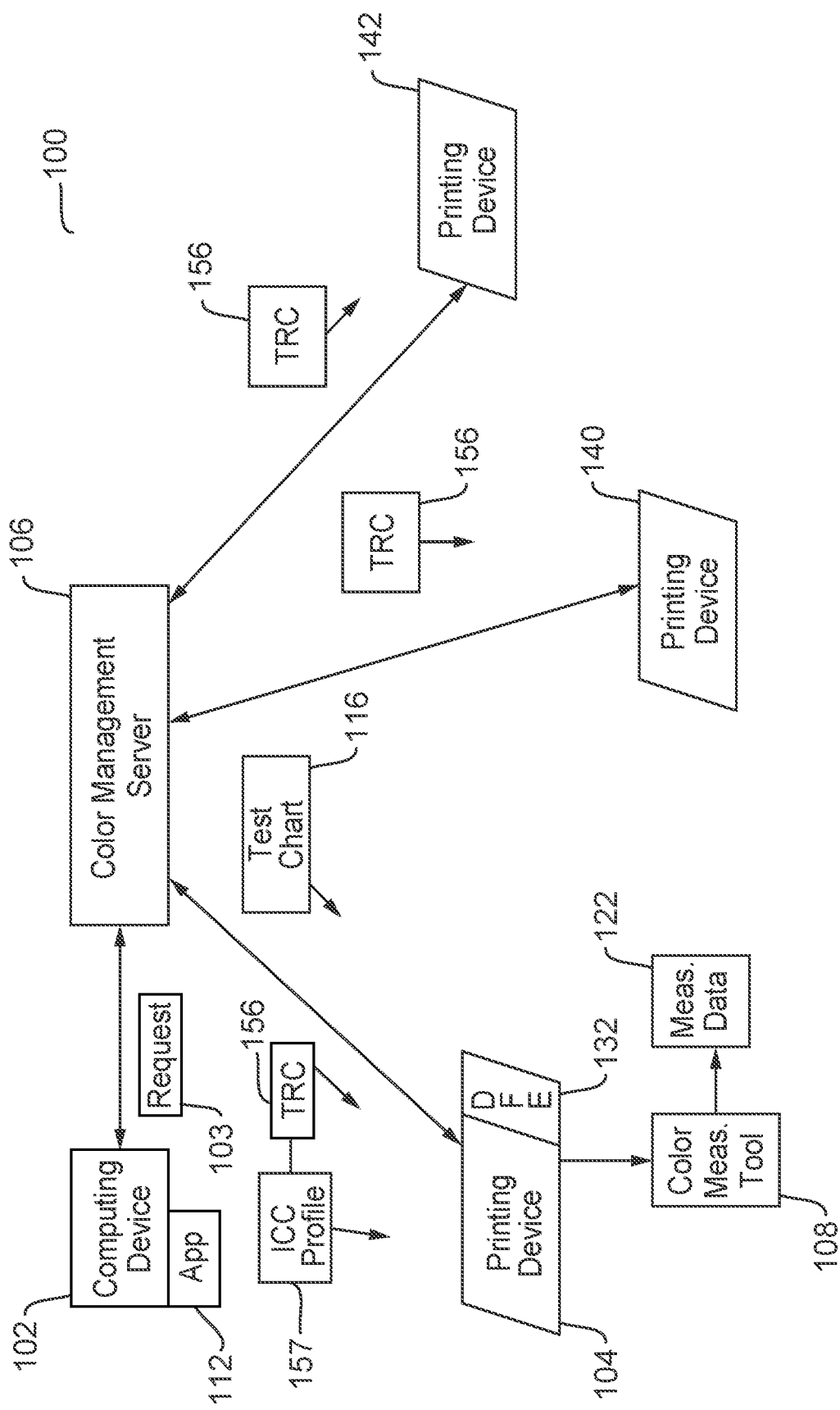
FIG. 1 illustrates a block diagram of a color management system for printing devices according to the disclosed embodiments.

FIG. 1 depicts a color management system 100 for printing devices 104, 140, and 142 according to the disclosed embodiments. Color management system 100 includes a color management server 106. Color management server 106 may be a server that registers all printing devices within system 100 and controls color management operations for the printing devices. In some embodiments, color management system 100 may be a system or network within a print shop having several or more printing devices.

Printing devices 104, 140, and 142 may receive print jobs from color management server 100. They also may receive calibration print jobs and quality checks from color management server 100. Test chart 116 may be generated to perform calibrations, disclosed in greater detail below. Other items and data files may be sent to printing devices 104, 140, and 142. Further, the printing devices may provide data and information to color management server 106 so that it may manage color printing operations within system 100.

In some embodiments, computing device 102 may include an application 112 that generates data for printing that is sent to color management server 106. Color management server 106 also may exchange data with printing device 104 for performing calibration operations, specifically color calibration. Color management server 106 is a server that manages print jobs and tasks between a plurality of printing devices 104, 140, and 142. Color management server 106 also provides calibration operations to the printing devices. An operator may perform calibration tasks for the plurality of printing devices using color management server 106 using computing device 102. In some embodiments, computing device 102 is incorporated with color management server 106.

Preferably, color management server 106 allows for inspection, calibration, and profiling for management of color print jobs. Color management server 106 may act as a software as a service (SaaS) solution that provides color management. The service enables repeatable color reproduction at the printing devices. Color management server 106 also may manage digital front ends (DFEs) from production printing which include paper catalogs. These paper catalogs may include paper measurements and paper color measurement profiles. For example, printing device 104 includes DFE 132.

In some embodiments, an operator may request calibration for printing device 104 within system 100. The user may utilize application 112 on computing device 102 to generate calibration request 103 for printing device 104. Calibration request 103 may include a request type, a printing device identification, and a media/paper identification. In order to ensure the best possible color reproduction, production printing devices may associate the retained color management profiles with specific paper media. Most printing devices may use hundreds of different paper types, with each paper resulting in printing and measuring color patches. Thus, the user may generate and send a large number of requests for calibrations of these different types of papers at once.

Color management server 106 receives calibration request 103 within system 100. Color management server 106 generates a test chart 116 to obtain measurement data for the paper at printing device 104. Test chart 116 includes color patches used to perform calibration operations. Test charts 116 may use colorant ramps for each colorant. Test chart 116 is forwarded to printing device 104, which prints it out on the indicated paper/media type. An operator takes test chart 116. The operator may use color measurement tool 108 to measure the color patches on test chart 116 to obtain measurement data 122. Alternatively, printing device 104 may include inline measurement tools that automatically measure the color patches within test chart 116.

The operator or printing device measures calibration chart 116 after it is printed out at the printing device. Measurement data 122 is captured by measuring the color patches and the printed colors associated therewith. The data is provided back to color management server 106 for analysis. Using the measured data, color management server 106 generates calibration tone reproduction curves (TRCs) 156 using calibration settings that may be set by the operator or system 100. Calibration settings may include end point targets and aims for the colors. Once the calibration TRCs 156 are created, they are downloaded to the printing device or devices. Alternatively, if calibration is implemented at the printing device, then calibration TRCs 156 may be stored in digital front end (DFB) 132. In some embodiment, a TRC 156 may be stored in multiple printing devices within system 100. Calibration TRCs 156 also may be associated with ICC profile 157 that is sent to printing device 104. ICC profile 157 may be built upon calibrated output such as measurement data 122. ICC profile creation is disclosed in greater detail below.

Figure 2:
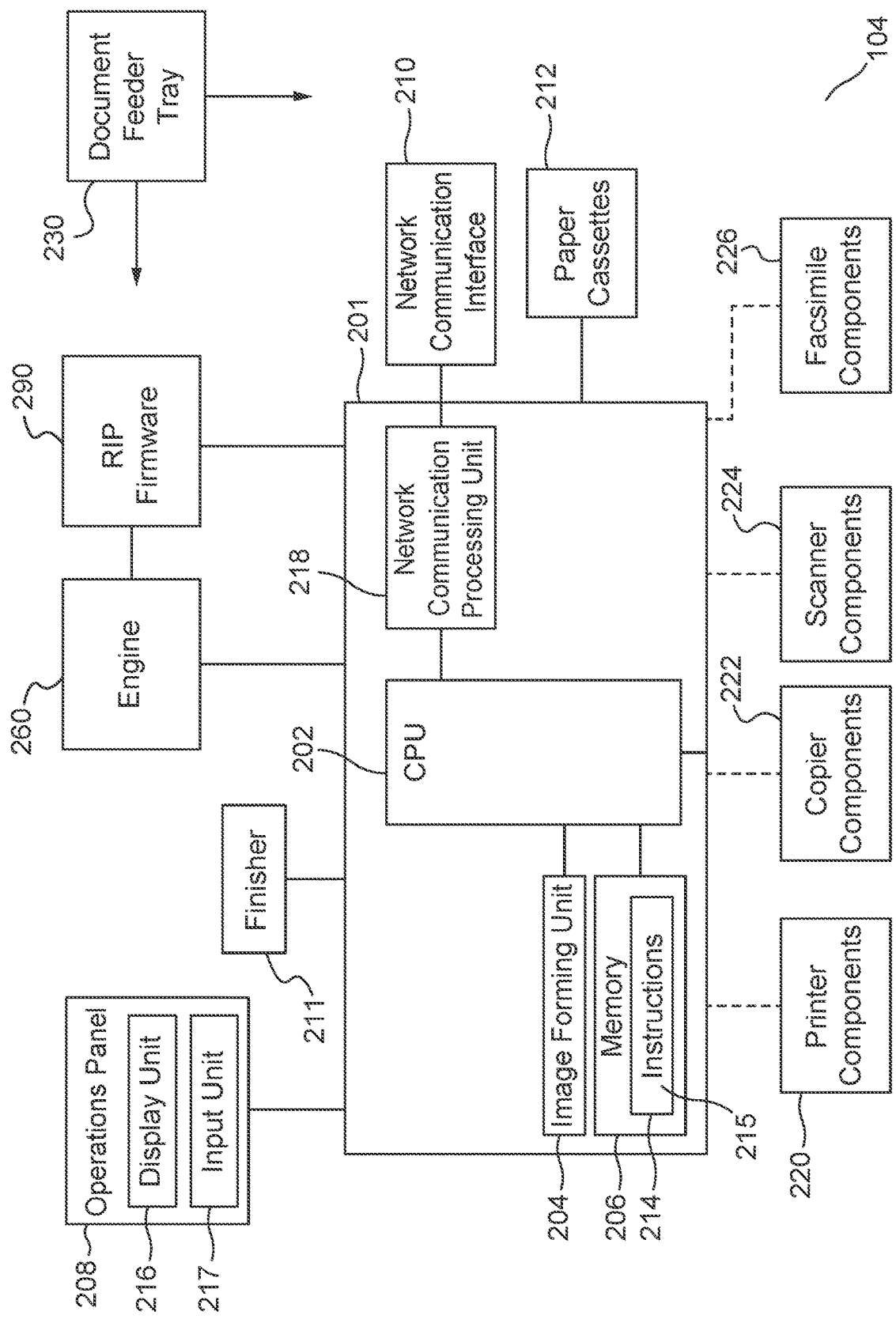
FIG. 2 illustrates a block diagram of components of a printing device according to the disclosed embodiments.

FIG. 2 depicts a block diagram of components of printing device 104 according to the disclosed embodiments. In the disclosure of FIG. 2, printing device 104 may be referred to for illustrative purposes. The architecture shown in FIG. 2 may apply to any multi-functional printing device or image forming apparatus that performs various functions, such as printing, scanning, storing, copying, and the like within system 100. As disclosed above, printing device 104 may send and receive data from color management server 106 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of printing device 104 to receive papers and documents to be processed. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 220. As shown in FIG. 2, document processor input feeder tray 230 may interact with engine 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with color management server 106 via network communication interface 210 by utilizing a network protocol, such as the ones listed above. In some embodiments, printing device 104 communicates with color management server 106 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from color management server 106.

In certain state-of-the-art inkjet printing devices, such as printing device 104, the ink formulations are so novel that they require a physical ink limit when used with certain media types, or paper. For these printing devices, each of the colorants may use different amounts of ink. An example of this requirement is an ink limit in terms of the maximum total ink value allowed, measured in pL.

Using industry standard percentage TAC ink limits may cause problems with these types of printing devices. For example, the operator may choose a percentage TAC that is low enough to ensure that all colors are within the volume ink limit. Selection of a low percentage TAC may be an issue because the resulting gamut will be smaller than what the printing device can reproduce. Alternatively, the operator may choose a percentage TAC that is high enough to ensure that it covers all colors that printing device 104 can reproduce. This selection may cause problems because certain colors may exceed the volume-based ink limits. Print jobs using these colors may cause the ink to run, thereby negatively impacting image quality and potentially contaminating the print path. Note that conventional ICC profile creation software tools all support only the percentage TAC as a specification of an ink limit. To continue using these existing tools, and to add support for volume-based ink limits, a new ICC profile creation method and procedure is needed.

The disclosed embodiments connect the two distinct ink limit specifications when creating ICC profile 157 for printing device 104. The feature may be known as a hybrid ink limit. The hybrid ink limit enables use of the full gamut of printing device 104 while ensuring that all colors reproduced by the printing device fall within the volume ink limit.

Figure 3:
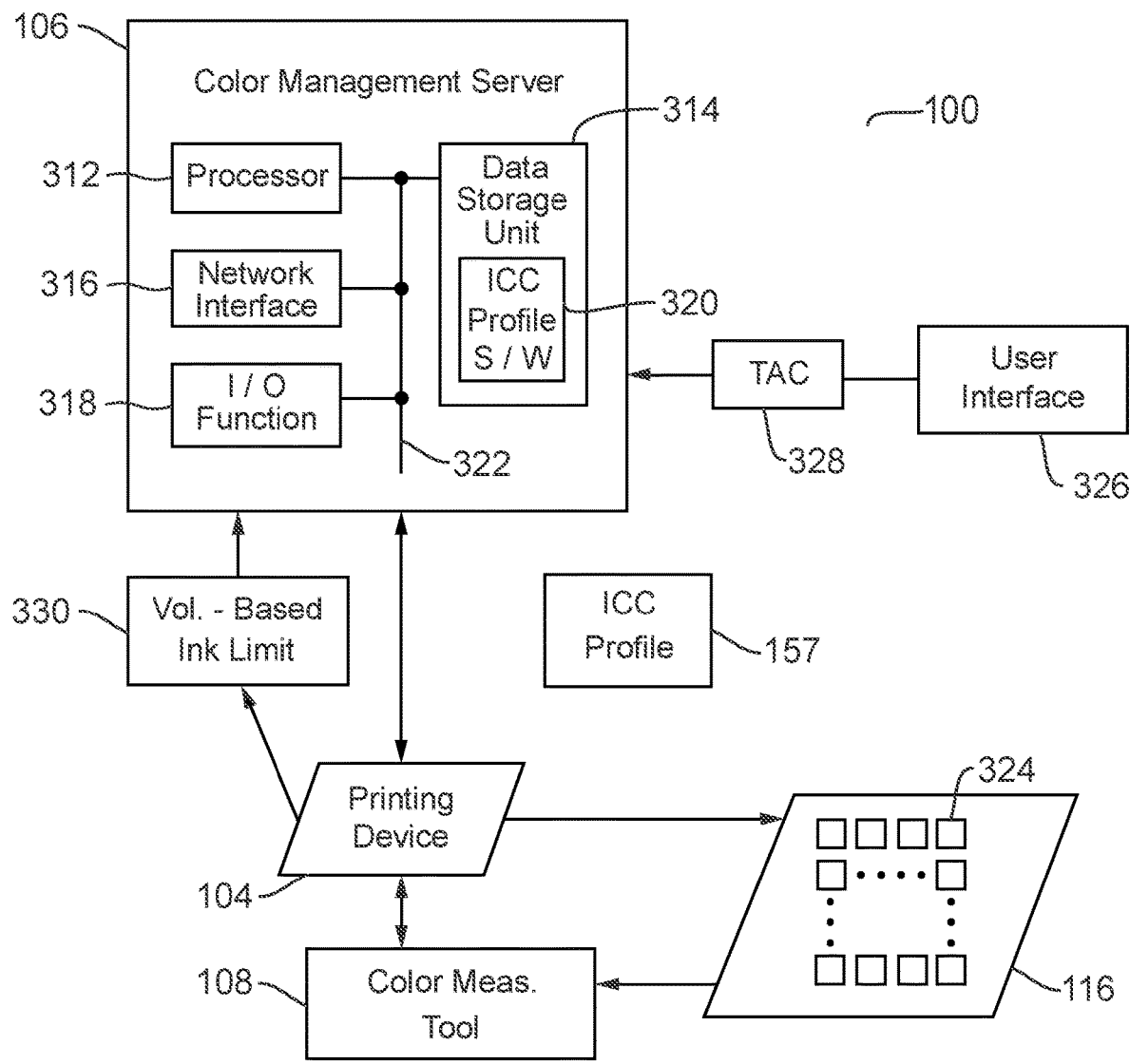
FIG. 3 illustrates a block diagram of the creation of an ICC profile at a printing device according to the disclosed embodiments.

FIG. 3 depicts a block diagram of the creation of ICC profile 157 at printing device 104 or color management server 106 according to the disclosed embodiments. System 100 of FIG. 1 is shown with emphasis on creating ICC profile 157. Color management server 106 also is shown. As disclosed above, color management server 106 may be any type of computing device capable of executing existing ICC profile maker software, such as a server, mobile phone, tablet computer, wearable computer, desktop computer, laptop computer, etc. In some embodiments, color management server 106 may operate as a part of printing device 104. For instance, color management server 106 may be located in DFB 132 and may operate the operating system of printing device 104. Thus, printing device 104 may execute the processes disclosed below. In other embodiments, color management server 106 and printing device 104 may be physically separate devices.

As shown in FIG. 3, color management server 106 includes a processor 312, data storage 314, network interface 316, and input/output function 318, all of which may be coupled by a system bus 322 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

Processor 312 may include one or more central processing units (CPUs), such as one or more general purpose processors and/or one or more dedicated processors (e.g., application specific integrated circuits also known as ASICs or digital signal processors also known as DSPs, etc.). Other types of processors can be used.

Data storage 314, in turn, may comprise volatile and/or non-volatile data storage and can be integrated in whole or in part with processor 312. Data storage 314 may store program instructions, executable by the processor 312, and data that are manipulated by these instructions to carry out the various methods, processes, or functions described herein. Alternatively, these methods, processes, or functions can be defined by hardware, firmware, and/or any combination of hardware, firmware and software. Therefore, data storage 314 may include a tangible, non-transitory computer-readable medium, having stored thereon program instructions that, upon execution by one or more processors, cause color management server 106 to carry out any of the methods, processes, or functions disclosed in this specification or the accompanying drawings.

In the embodiment shown in FIG. 3, data storage 314 may store ICC profile software 320, which can be executed by processor 312 to create and modify ICC profiles. ICC profile software 320 also may be known as the ICC profile creation tool. The ICC profile software 320 may correspond to conventional profile creation tools designed to create ICC profiles, such as ICC profile 157. In some embodiments, data storage 314 may also store one or more ICC profiles for use by one or more printing devices, such as printing device 104.

The ICC profiles may be generated by the ICC profile software 320 or obtained from other computing devices through wired or wireless communication.

Network interface 316 may take the form of a wire line connection, such as an Ethernet, Token Ring, or T-carrier connection. Network interface 316 may alternatively take the form of a wireless connection, such as WiFi, BLUETOOTH®, or a wide-area wireless connection. However, other forms of physical layer connections and other types of standard or proprietary communication protocols may be used over network interface 316. Furthermore, network interface 316 may comprise multiple physical communication interfaces.

Input/output function 318 may facilitate user interaction with color management server 106. Input/output function 318 may comprise multiple types of input devices, such as a keyboard, a mouse, a touch screen, a microphone, or any other device that is capable of receiving input from a user. Similarly, input/output function 318 may comprise multiple types of output devices, such as a display, printer, one or more light emitting diodes (LEDs), speaker, or any other device that is capable of providing output discernible to a user. Alternatively, for example, color management server 106 may support remote access from another device, via network interface 316 or via another interface (not shown), such as an RS-132 or Universal Serial Bus (USB) port.

System 100 may enable the generation of new ICC profiles, such as the ICC profile 157. To illustrate an example ICC profile generation process, system 100 may initiate the generation of the new ICC profile by causing printing device 104 to print a test chart 116 based on a source color space, such as a cyan-magenta-yellow-black profile chart, as shown by color patches 324. Printing device 104 may print test chart 116 using a 4D-LUT ink limiter that limits the ink total of the different CMYK ink combinations making up the various color segments of test chart 116. In particular, each CMYK ink combination would be equal to or below the ink limit enforced by the 4D-LUT ink limiter.

Test chart 116 can be measured by a color measurement tool 108, such as a spectrophotometer. Color measurement tool 108 may obtain color measurements of the different color segments, or color patches 324, of test chart 116, which can be used by the ICC profile software 320 to generate an initial ICC printer profile based on measurement data 122. Color management server 106 may then provide ICC profile 157 to one or more printers (e.g., printing device 104) and store ICC profile 157 at data storage unit 314.

Figure 4A:
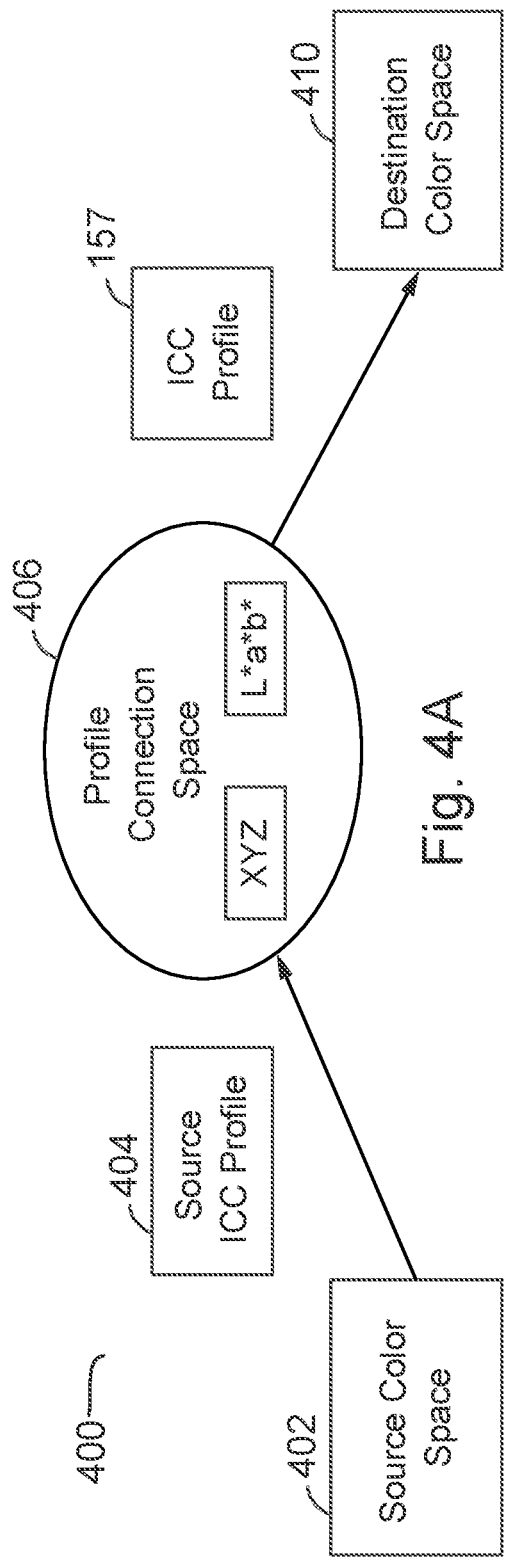
FIG. 4A illustrates a color conversion system for use with the color management system according to the disclosed embodiments.

FIG. 4A illustrates a color conversion system 400 for use with system 100 according to the disclosed embodiments. Color conversion system 400 represents a managed color workflow that offers color consistency and predictability during color conversion. As shown in FIG. 4A, color conversion system 400 includes a source color space 402, a source ICC profile 404, a profile connection space (PCS) 406, ICC profile 157, and a destination color space 410. Color conversion system 400 may be implemented on color management server 106 or printing device 104.

Color conversion system 400 may be used for color conversion from a source color space 402, or colors associated with a print job, to destination color space 410, or CMYK ink combinations that a printing device can print. Color conversion system 400 may involve initially obtaining the source color space 402, which may represent colors used by a source device (e.g., a computer monitor, a scanner). Some examples of the source color space can include an RGB color space, a CMYK color space, and a CMYKOGV color space.

Color conversion system 400 further involves identifying a source ICC profile 404 that corresponds to source color space 402. Source ICC profile 404 may provide a mapping for colors within source color space 402 to PCS 406. For example, source ICC profile 404 may store one or more LUTs that can be used to map source color space 402 to the L*a*b* color space or to the XYZ color space for PCS 406. Alternatively, source ICC profile 404 can include one or more equations for mapping source color space 402 to the L*a*b* color space or to the XYZ color space for PCS 406.

PCS 406 can serve as the interface which provides an unambiguous connection between input profiles, such as source ICC profile 404, and output profiles, such as ICC profile 157 within color conversion system 400. PCS 406 can allow the profile transforms for input, display, and output devices to be decoupled so that they can be produced independently. As such, PCS 406 can serve as the virtual destination for input transforms and the virtual source for output transforms. When the input and output transforms are based on the same PCS definition, even though they are created independently, the input and output transforms can be paired arbitrarily at run time by a color-management module (CMM), such color conversion system 400, and will yield consistent and predictable results when applied to color values.

ICC profile 157 may enable mapping colors from PCS 406 to destination color space 410. In particular, ICC profile 157 may provide a mapping for colors within PCS 406 to destination color space 410. For example, ICC profile 157 may store one or more LUTs that can be used to map input colors from PCS 406, or the L*a*b* color space, to the CMYK color space associated with destination color space 410. Alternatively, ICC profile 157 can include one or more equations for mapping colors from PCS 406 to destination color space 410. In some instances, the selection of ICC profile 157 may depend on the type of printing device performing the print job using destination color space 410.

Figure 4B:
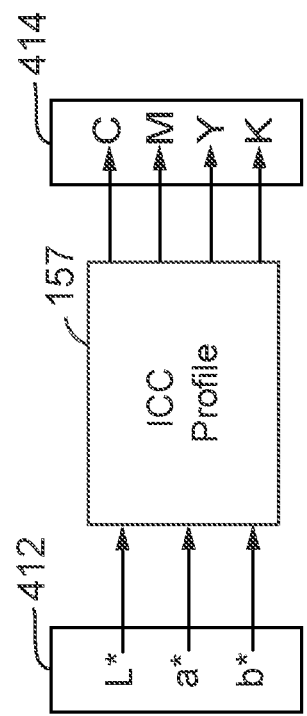
FIG. 4B further illustrates the color conversion system according to the disclosed embodiments.

FIG. 4B illustrates inputs and outputs for ICC profile 157 according to the disclosed embodiments. As shown, ICC profile 157 may represent a destination ICC profile configured to enable a device to map input L*a*b* values 412 obtained from PCS 406 shown in FIG. 4A to output CMYK values 414 used to complete the print job. For instance, ICC profile 157 can store one or more LUTs, such as a LUT for mapping colors from the L*a*b* color space to destination color space 410.

Referring to FIGS. 3, 4A, and 4B, original content with reference to device independent color is input to printing device 104. Color conversion system 400 attempts to produce a color match based on the input device independent color specification and available printing device colorants. A key piece in this workflow is the ICC profile. Source ICC profile 404 ties colors of the input content of source color space 402 to device independent measures. ICC profile 157, or destination ICC profile, provides information on how to convert the device independent input colors to printing device CMYK value 214. Thus, an important step in setting up a printing device is the creation of ICC profile 157 as the destination ICC profile. More specifically, an ICC profile 157 should be created for each specific media brand/type and model, along with the particular printing conditions.

Printing device characterization occurs with ICC profile software 320 that relates printing device CMYK quantities, in terms of their raw measurements, to device independent color values, which leads to creation of ICC profile 157. Multiple settings should be determined to process and package the printing device characterization data into an ICC profile. Settings may include the size and the precision of the conversion tables, the K colorant usage, the handling of out of gamut input colors, and the like.

One fundamental and crucial setting is the ink limit. Each media type has a physical limit of how much ink it can hold without physical issues, such as soak through and excessive curling, or imaging concerns, such as loss of details and smearing. Typically, an ink limit is specified in terms of the percentage of total area coverage (TAC), as disclosed above. For CMYK printing devices, the contribution of each colorant ranges from 0% to 100% ink. For any and all CMYK combinations that make a color, contribution of each ink is summed up at the TAC. Typical ink limits may be from 250% to just over 300% TAC.

In certain printing devices, the ink formulations are so novel that they require a physical ink limit when used with certain media types. An example of this requirement is an ink limit in terms of the maximum total ink volume allowed, as measured in pL. Further, in such novel volume-based ink limit specifications, the contribution of each ink is not uniform with non-linear volume progression per colorant level increase.

Referring back to FIG. 3, a user interface 326 may be provided for all required settings to do ICC profile creation at color management server 106 or, alternatively, at printing device 104. In some embodiments, user interface 326 may be implemented on another computing device, such as computing device 102 or application 112. User interface 326 may receive input of a percentage TAC ink limit 328. The disclosed embodiments also relies on processes to combine percentage TAC ink link 328 and volume-based ink limit 330 inherent to the media type in use. Volume-based ink limit 330 may provided by printing device 104. User interface 326 may capture an input of media type for percentage TAC ink limit 328.

Figure 5:
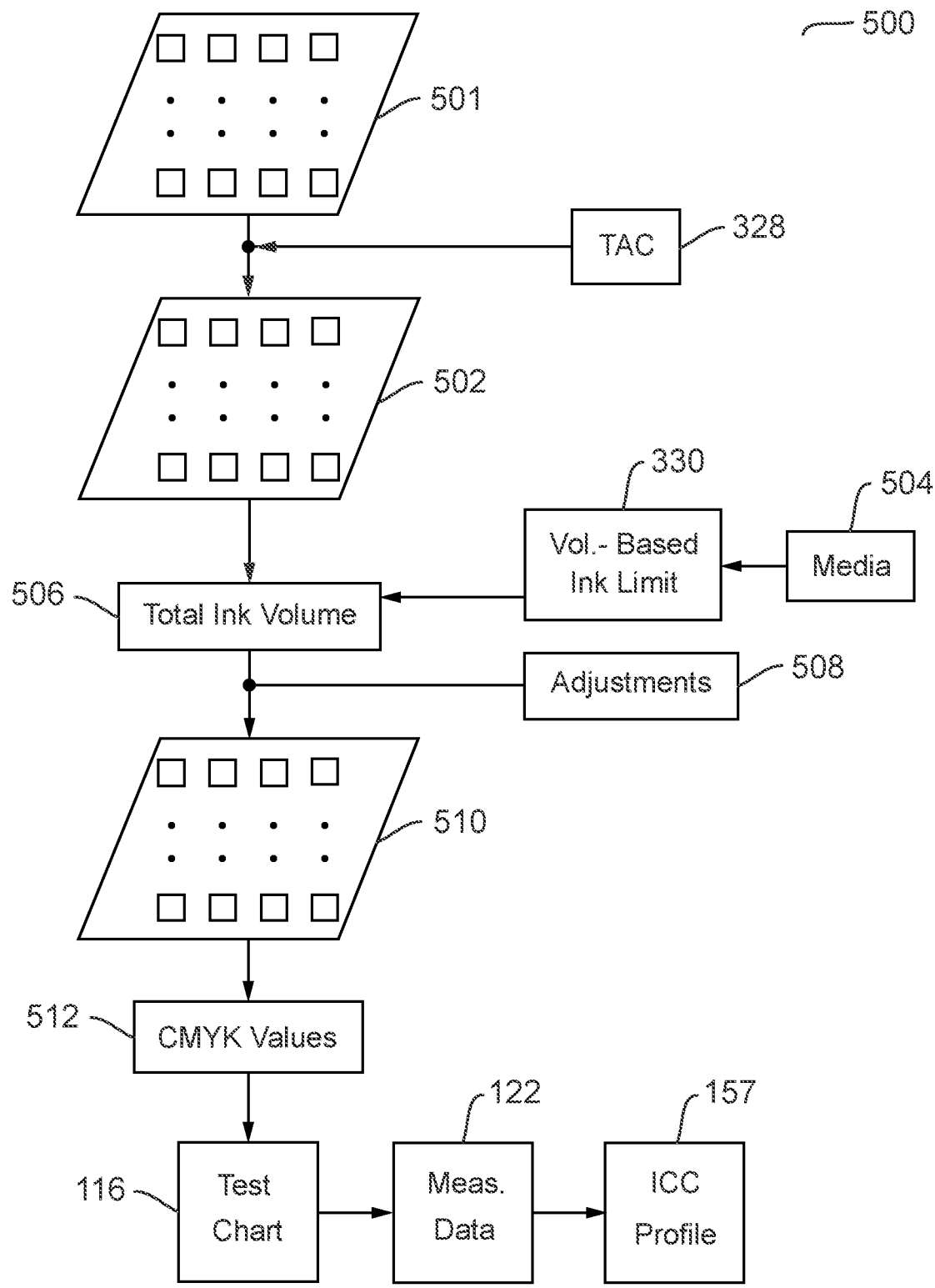
FIG. 5 illustrates a flow diagram for applying hybrid ink limits according to the disclosed embodiments.

FIG. 5 depicts a flow diagram 500 of data for applying hybrid ink limits according to the disclosed embodiments. Flow diagram 500 may refer to features disclosed by FIGS. 1-4B for illustrative purposes. As shown in FIG. 5, a hybrid ink limit process is applied to the printing of test chart 116, which includes color patches 324. The hybrid ink limit brings together the percentage TAC ink limit with unorthodox physical volume-based ink limits. The disclosed embodiments may interface with the operator to obtain the hybrid ink limit. The operator may specify the percentage TAC ink limit in the ICC profile creation user interface, or user interface 326. The disclosed embodiments may retrieve the physical volume ink limit based on the identified media type. Hybrid ink limits are implemented using conventional ICC profile creation tools.

Prior to the printing device characterization process, color management server 106 may put together a set of color patches 501 that represent the color combinations to be printed on media 504 at printing device 104. The set of color patches 501 includes a wide range of CMYK combinations to represent the printing device's raw responses. Measurements of these CMYK combinations tell the ICC profile creation software 320 the capability of printing device 104. There may be established CMYK samplings that are commonly used. There also may be samplings computed per the number of color patches 501 desired. These CMYK quantities may be called the patch set.

As disclosed above, user interface 326 may receive an input for percentage TAC ink limit 328 to the patch set, shown as color patches 501 in FIG. 5. This process scales down any excessive CMYK combinations to meet percentage TAC ink limit 328. Percentage TAC ink limit 328 may be implemented in different manners. One way is to adjust CMYK quantities for test chart 116 to adhere to the percentage TAC ink limit. Another way is to inform ICC profile creation software 320 to use the specific percentage TAC ink limit. The disclosed embodiments may use the first way to implement percentage TAC ink limit 328. Color patches 501 are adjusted by the application of percentage TAC ink limit 328 to generate patch set 502. For any combinations over percentage TAC ink limit 328, these combinations are scaled down to meet the ink limit.

Next, the disclosed embodiments apply volume-based ink limit 330. In order to work with volume-based ink limits, the disclosed embodiments are confined with volume information for each colorant. Volume-based ink limit 330 may be determined based on the type of media 504 to be used. Media 504 may relate to paper media loaded onto printing device 104. ICC profile 157 is created for media 504 to manage color printing operations using the media, as disclosed above.

Volume information for each colorant may include an ink curve for each colorant. The ink curve specifies ink volume at different colorant percentages. The ink volumes of the four colorants may not be uniform with input level. Thus, a table for each of the four inks at each input level for all percentage area coverage may resemble a curve. Volume information also may include the maximum ink volume per colorant, such as 80%, 90%, 100%. Volume information also may include the total volume ink limit when combining multiple colorants. The volume information is stored, such as on color management server 106 or printing device 104, for each of the different media types supported by printing device 104.

The disclosed embodiments evaluates the primary colors of CMYK for each patch of patch set 502 for test chart 116 by converting the colors to a total ink volume 506. For media 506, total ink volume 506 is evaluated against volume-based ink limit 330. Thus, for color patches within patch set 504 already adjusted to adhere to percentage TAC ink limit 328, enforcement is made based on the physical volume ink limit to the CMYK quantities.

Adjustments 508 are made for any CMYK combination that exceeds volume-based ink limit 330. The disclosed embodiments may adjust those colors that exceed volume-based ink limit 330 by lowering the ink volumes until they come under the ink limit for media 504. Adjustments to one or more of the color patches of patch set 502 results in patch set 510.

The disclosed embodiments may adjust ink volumes in a number of different ways. For example, color management server 106 or printing device 104 may lower the ink volume for all colors that exceed the ink volume to the maximum ink volume. Color management server 106 or printing device 104 may lower the ink volume of the colors that use the highest ink volume to the maximum ink volume. The disclosed embodiments then may proportionally lower volume for all colors that are over the ink limit but to a lesser extent than the maximum ink volume colors. When adjusting ink volumes, the disclosed embodiments may adjust colors in a number of ways. The disclosed embodiments may reduce the volume of all colorants uniformly. Alternatively, the disclosed embodiments may reduce the volume of all colorants proportionally.

After the ink volumes are adjusted and patch set 510 generated, color management server 106 or printing device 104 will convert the volumes back to CMYK values 512. CMYK values 512 may be similar to CMYK values 414, disclosed above. CMYK values 512 are applied to the color patches in test chart 116 used to create ICC profile 157. Now that the hybrid ink limit is applied, test chart 116 may be printed on printing device 104.

Alternatively, instead of adjusting ink volumes, the disclosed embodiments may opt to iteratively adjust the colors directly until they fall under the ink volume limits. The disclosed embodiments may lower CMYK values either by adjusting colors and evaluating ink use or by using a lookup table to adjust values to the closest value that falls under the ink limit.

After color patches 324 of patch set 510 are measured by color measurement tool 108 to capture the device independent colors, printing device 104 or tool 108 sends measurement data 122 along with the patch set numerical data to color management server 106 and ICC profile software 320, which is the tool to create ICC profile 157. ICC profile software 320 may complete generation of ICC profile 157 according to the measured patch set and the various settings, including percentage TAC ink limit 328. Volume-based ink limit 330 for media 504 also is imposed on the measured patch set provided to ICC profile software 320. The disclosed embodiments also post-process output colors to ensure the volume ink limit is observed. ICC profile software 320 is not consciously working with volume-based ink limit 330. From real word studies, resultant ICC profile 157 may still output a small number of CMYK combinations that are over volume-based ink limit 330 for media 504.

The disclosed embodiments, therefore, include a post-processing step to identify those CMYK combinations over volume-based ink limit 330. An adjustment is made to such combinations to bring them within the volume limit. The disclosed embodiments may reduce quantity or step back then recheck to remove any potential for CMYK combinations over volume-based ink limit 330. In other words, another imposition of the volume ink limit is performed to the contents of the look-up-tables for ICC profile 157. Any CMYK combination over volume-based ink limit 330 is adjusted accordingly.

Figure 6:
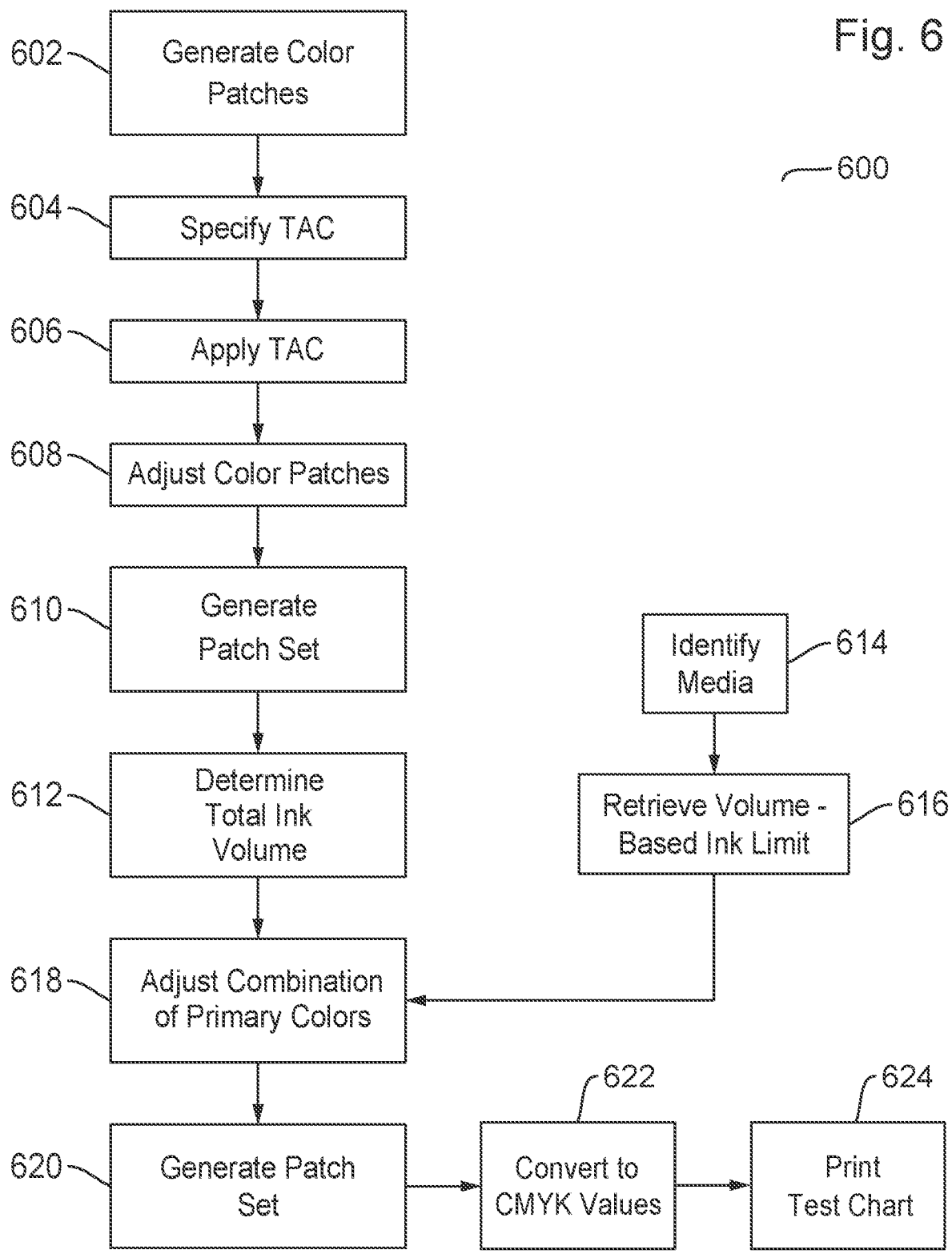
FIG. 6 illustrates a flowchart for applying a hybrid ink limit for a test chart according to the disclosed embodiments.

FIG. 6 depicts a flowchart 600 for applying a hybrid ink limit for test chart 116 according to the disclosed embodiments. Flowchart 600 may refer to FIGS. 1-5 for illustrative purposes. Flowchart 600, however, is not limited by the embodiments disclosed by FIGS. 1-5.

Step 602 executes by generating a plurality of color patches 501 to be used to generate the color patches printed on test chart 116, shown as color patches 324 in FIG. 3. The set of color patches represents the wide range of CMYK combinations for use within printing device 104. These combinations help build the dataset used to generate ICC profile 157. Step 604 executes by specifying percentage TAC ink limit 328. Preferably, percentage TAC ink limit 328 is received as an input using user interface 326. This feature allows operators familiar with industry standard practices to continue routine, common operations of percentage TAC ink limit input.

Step 606 executes by applying percentage TAC ink limit 328 to the set of color patches to scale down any excessive CMYK combinations to meet the percentage TAC ink limit. Step 608 executes by adjusting the set of color patches to meet percentage TAC ink limit 328. This set may be a subset of all the color patches generated from ICC profile creation. Step 610 executes by generating patch set 502 for the color patches meeting percentage TAC ink limit 328.

Step 612 executes by determining total ink volume 506 for each CMYK combination. A color is converted to total ink volume 506. Thus, each color represented by a color patch in patch set 502 may have a total ink volume 506.

Step 614 executes by identifying media 504 for ICC profile 157. Media 504 may refer to the paper media or type to be used during printing operations. Different media have different characteristics that impact color reproduction on that media. These characteristics include an ink limit. Step 616 executes by retrieving volume-based ink limit 330 for media 504. Volume-based ink limit 330 may be provided with media 504 or stored within system 100, such as on color management server 106. Steps 614 and 616 may be executed concurrently with or even before steps 602-612. Alternatively, steps 614 and 616 may be executed when the application of percentage TAC ink limit 328 is completed.

Step 618 executes by adjusting CMYK combinations that have total ink volumes 506 that exceed volume-based ink limit 330. Volume-based ink limit 330 is applied to patch set 502. Total ink volume 506 for each color patch is evaluated against volume-based ink limit 330 specific for media 504. The disclosed embodiments adjust colors by lowering the ink volumes until they come under the volume-based ink limit for media 504. Step 620 executes by generating patch set 510 with the color patches adjusted by the hybrid ink limit of percentage TAC ink limit 328 and volume-based ink limit 330.

Step 622 executes by converting patch set 510 to CMYK values 512. CMYK values 512 are embodied by color patches 324 in test chart 116. Step 624 executes by printing test chart 116 at printing device 104. As disclosed above, test chart 116 includes color patches 324, that have the hybrid ink limit applied.

Figure 7:
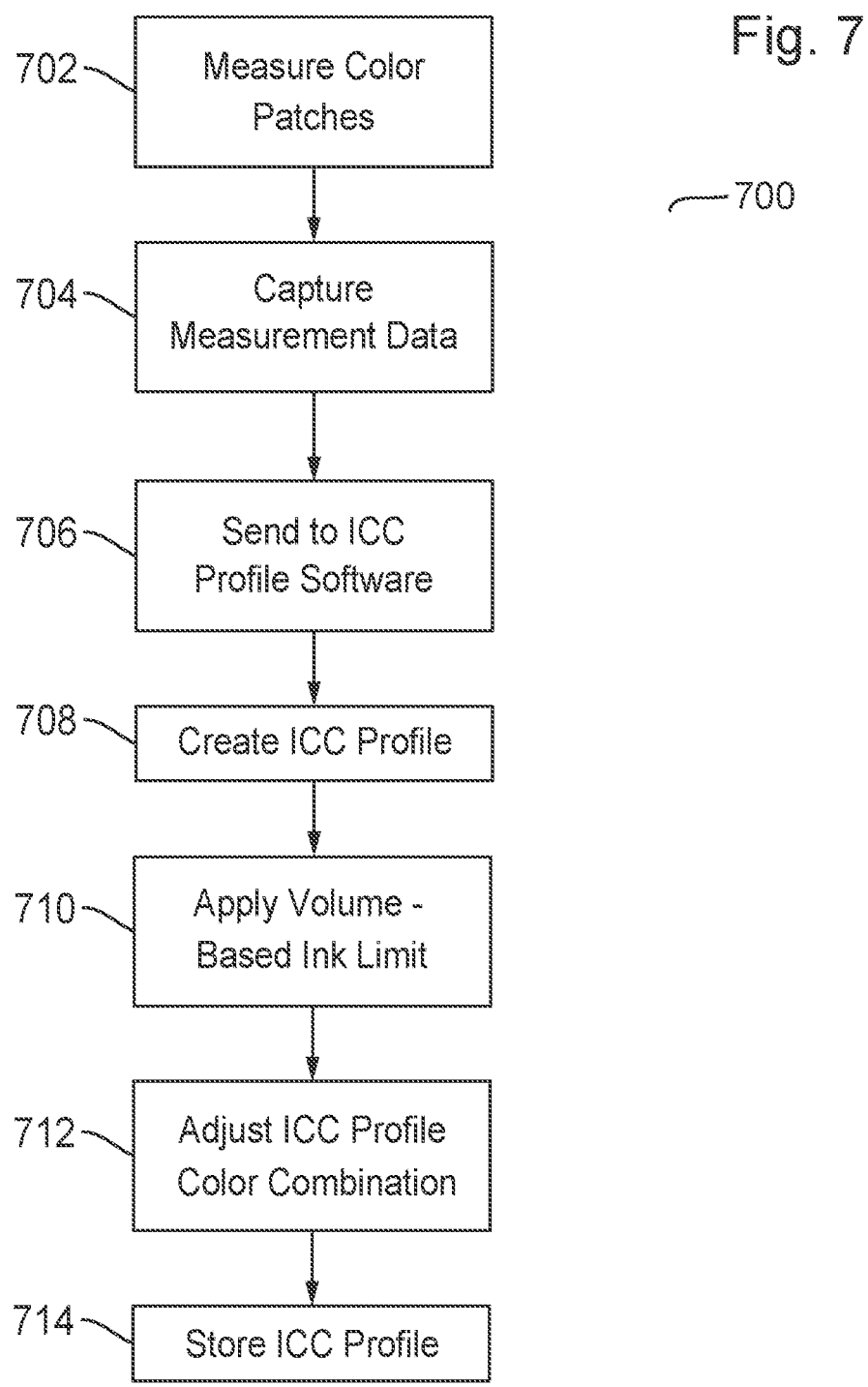
FIG. 7 illustrates a flowchart for creating an ICC profile according to the disclosed embodiments.

FIG. 7 depicts a flowchart 700 for creating ICC profile according to the disclosed embodiments. Flowchart 700 may refer to FIGS. 1-6 for illustrative purposes. Flowchart 700, however, is not limited by the embodiments disclosed by FIGS. 1-6.

Step 702 executes by measuring color patches 324 on test chart 116 using color measurement tool 108. Step 704 executes by capturing measurement data 122 with color measurement tool 108. Step 706 executes by sending measurement data 122 to ICC profile software 320. ICC profile software 320 may be known as the ICC profile creation tool within system 100. Step 708 executes by creating ICC profile 157 based on measurement data 122. ICC profile software 320 generates ICC profile 157 according to the measured patch set of test chart 116 and the various settings, including percentage TAC ink limit 328.

Step 710 executes by applying volume-based ink limit 330 to the contents of ICC profile 157 to identify CMYK combinations that exceed the volume-based ink limit. As disclosed above, a small number of CMYK combinations may still exceed the volume-based ink limit for media 504 as ICC profile software 320 is not consciously working with this value. Use of ICC profile 157 may still result in not well-behaved outputs. Step 712 executes by adjusting one or more ICC profile CMYK combinations to bring the not well-behaved outputs associated with the combinations within volume-based ink limit 330. Step 714 executes by storing ICC profile 157 at printing device 104 for use when color printing using media 504.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method for applying hybrid ink limits for color printing, the method comprising:
   generating a plurality of color patches for a test chart, wherein each of the plurality of color patches is a combination of primary colors;
   applying a percentage total area coverage (TAC) ink limit to the plurality of color patches;
   determining if a color patch includes a combination of primary colors that exceeds the percentage TAC ink limit;
   scaling back the combination of primary colors to meet the percentage TAC ink limit;
   determining a total ink volume for the combination of primary colors for the color patch;
   adjusting the combination of primary colors for the color patch if the total ink volume exceeds a volume-based ink limit for a media supported by a printing device; and
   printing the adjusted color patch with the test chart at the printing device.

2. The method of claim 1, further comprising measuring the adjusted color patch with a color measurement tool.

3. The method of claim 1, further comprising inputting the percentage TAC ink limit.

4. The method of claim 1, further comprising retrieving the volume-based ink limit based on the media type.

5. The method of claim 1, further comprising creating an ICC profile based on the captured data and the percentage TAC ink limit.

6. The method of claim 5, further comprising specifying the percentage TAC ink limit.

7. The method of claim 1, wherein the volume-based ink limit is based on volume information for each primary color of the combination of primary colors.

8. The method of claim 7, wherein the volume information includes a total volume ink limit for the combination of primary colors.

9. The method of claim 8, further comprising evaluating the combination of primary colors for the color patch by converting each primary color into a color ink volume value.

10. The method of claim 9, further comprising evaluating a total color ink volume value of the color ink value values for the primary colors against the total volume ink limit based on the media.

11. A method of creating an ICC profile having a hybrid ink limit, the method comprising:
    generating a plurality of color patches for a media, wherein each color patch is a combination of primary colors;
    specifying a percentage total area coverage (TAC) ink limit;
    applying the percentage TAC ink limit to the plurality of color patches;
    adjusting a first set of color patches having a combination of primary colors that exceeds the percentage TAC ink limit;
    applying a volume-based ink limit corresponding to the media to the plurality of color patches;
    adjusting a second set of color patches having a combination of primary colors that exceeds the volume-based ink limit;
    printing a test chart having the plurality of color patches;
    measuring the plurality of color patches to capture measurement data;
    creating the ICC profile based on the captured measurement data and the specified percentage TAC ink limit;
    applying the volume-based ink limit on ICC profile color combinations within the ICC profile; and
    adjusting an ICC profile color combination that exceeds the volume-based ink limit.

12. The method of claim 11, wherein measuring the plurality of color patches includes measuring the adjusted first set of color patches and the adjusted second set of color patches.

13. The method of claim 11, further comprising inputting the percentage TAC ink limit.

14. The method of claim 11, further comprising retrieving the volume-based ink limit based on the media.

15. The method of claim 11, wherein applying the volume-based ink limit on the ICC profile color combinations within the ICC profile includes applying the volume-based ink limit to the ICC profile color combinations of a look-up table of the ICC profile.

16. A color printing system configured to
    generate a plurality of color patches for a media, wherein each color patch is a combination of primary colors;
    specify a percentage total area coverage (TAC) ink limit;
    apply the percentage TAC ink limit to the plurality of color patches;
    adjust a first set of color patches having a combination of primary colors that exceeds the percentage TAC ink limit;
    apply a volume-based ink limit corresponding to the media to the plurality of color patches;
    adjust a second set of color patches having a combination of primary colors that exceeds the volume-based ink limit;
    print a test chart having the plurality of color patches at a printing device;
    measure the plurality of color patches to capture measurement data with a color measurement tool;
    create the ICC profile based on the captured measurement data;
    apply the volume-based ink limit on ICC profile color combinations within the ICC profile; and
    adjust an ICC profile color combination within the ICC profile that exceeds the volume-based ink limit.

17. The color printing system of claim 16, wherein the printing device stores the volume-based ink limit for the media.

18. The color printing system of claim 16, wherein the system is further configured to send the measurement data to a color management server.

19. The color printing system of claim 16, wherein the primary colors are cyan, magenta, yellow, and black.

20. The color printing system of claim 16, wherein the printing device is configured to store the ICC profile including the adjusted profile color combination.

* * * * *